United States Patent Office 3,583,976
Patented June 8, 1971

---

3,583,976
NONAMETHYLENEIMINES
William J. Houlihan, 15 Raynold Road, Mountain Lakes, N.J. 07046, and Robert E. Manning, 350 Baldwin Road, Parsippany, N.J. 07054
No Drawing. Filed Dec. 7, 1965, Ser. No. 512,207
Int. Cl. C07d 39/12, 41/00
U.S. Cl. 260—239
1 Claim

ABSTRACT OF THE DISCLOSURE

This disclosure pertains to octahydro-3-benzazecines, e.g., 10,11 - dimethoxy - 3-methyl-8-phenyl-1,2,3,4,5,6,7,8-octahydro-3-benzazecine. These compounds are useful as central nervous system stimulants, hypotensives and anti-inflammatories.

---

The present invention is directed to pharmaceutically acceptable benzazecines, particularly 1,2,3,4,5,6,7,8-octahydro-3-benzazecines of the formula

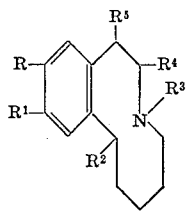

wherein

R is either lower straight chain alkoxy, preferably methoxy, ethoxy, propoxy or butoxy; methyl; ethyl; a hydrogen atom; or, together with $R^1$, methylenedioxy

(—O—CH$_2$—O—)

$R^1$ is either lower straight chain alkoxy, preferably methoxy, ethoxy, propoxy, or butoxy; methyl; ethyl; a hydrogen atom; or together with R, methylenedioxy

(—O—CH$_2$—O—)

$R^2$ is either a hydrogen atom (—H); lower alkyl, preferably methyl, ethyl, propyl or butyl; monocyclic aryl of the formula

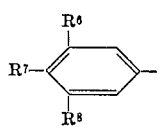

e.g. phenyl; or monocyclic aralkyl of the formula

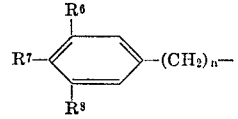

e.g. benzyl;
$R^3$ is lower straight chain alkyl, preferably methyl, ethyl, propyl and butyl;
$R^4$ is either a hydrogen atom, methyl or ethyl;
$R^5$ is either a hydrogen atom, methyl or ethyl;
each of $R^6$, $R^7$ and $R^8$ is, independently, either lower straight chain alkoxy, preferably methoxy, ethoxy, propoxy or butoxy; methyl; ethyl, or a hydrogen atom; and
n is 1, 2 or 3; and acid addition salts thereof.

It is an object of this invention to provide new pharmaceutically acceptable and therapeutically active compounds. It is a further object to provide such compounds both as free bases and as pharmaceutically acceptable acid addition salts thereof. Additional objects will be apparent from the description which follows.

Compounds of Formula I are prepared according to the following reaction scheme:

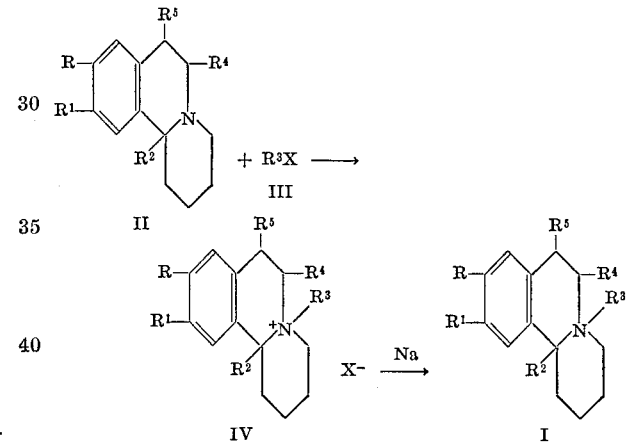

wherein

X is a halogen atom, e.g. iodine (—I) and chlorine (—Cl).

The quaternary ammonium salt IV is prepared at room temperature (20° C.) in a solvent, e.g. an ether (diethylether or dioxane), either alone or in combination with another solvent, e.g. methylene chloride.

Compound I is prepared from IV in liquid ammonia at a temperature from —70° to 0° C. The metal sodium can be replaced by other alkali metals, e.g. lithium or potassium. As a solvent system for this reaction there may be used lower monoalkylamines ($R^0$—NH$_2$), e.g. methylamine, ethylamine and propylamine; lower dialkylamines ($R^0$—NH—R') wherein each of $R^0$ and R' is, independently, either methyl, ethyl or n-propyl, e.g. dimethylamine; or lower alkylene diamines

[R"—NH—(CH$_2$)$_m$—NH—R*]

wherein each of R" and R* is, independently, either a hydrogen atom, methyl, ethyl or n-propyl and m is either 2 or 3, e.g. N,N'-dimethylethylenediamine.

Compounds II are prepared according to the following reaction scheme:

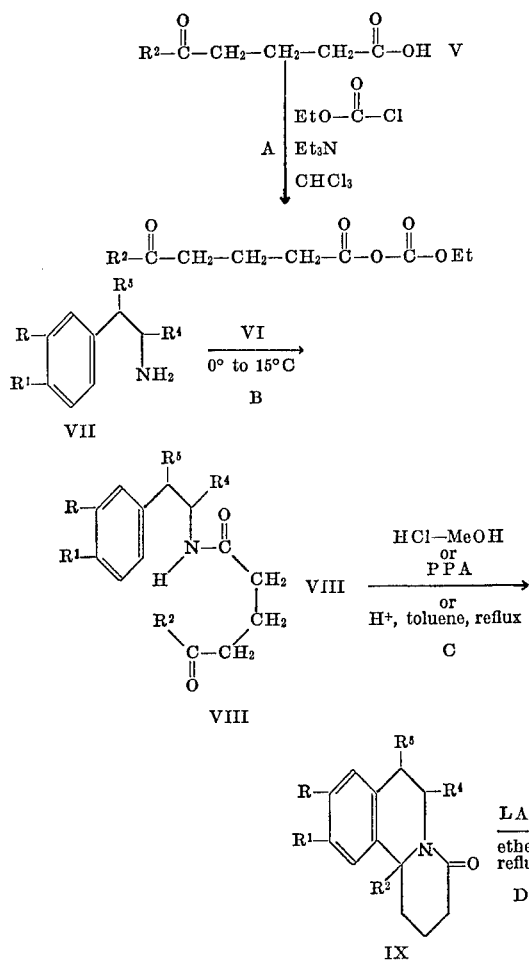

Steps A and B are effected sequentially (without separation) to form a mixed anhydride VI by admixing ethyl chloroformate (ethyl chlorocarbonate) with a keto acid V and triethylamine in chloroform at a temperature from 0° to 15° C., followed by admixture of a β-phenethylamine VII with the resultant (maintained in the same temperature range).

Step C is a cyclization. It is effected with polyphosphoric acid (PPA) at a temperature from 60° to 120° C. Alternatively, it may be effected with either from a 0.5 to a 5.0 percent methanolic solution of hydrogen chloride at a temperature from room temperature (20° C.) to reflux or with an acid, such as para-toluenesulfonic acid, in toluene under reflux.

Step D is effected by refluxing (with stirring) with lithium aluminum hydride (LAH) in an ether, such as diethylether, dibutylether, tetrahydrofuran and dioxane.

Among the pharmaceutically acceptable acid addition salts of compounds I are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid ($H_3C—SO_3H$); dibasic acids, e.g. succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicylic acid and arylsulfonic acids, such as benzenesulfonic acid. The only limitation on the acid selected is that the resulting acid addition salt be pharmaceutically acceptable; the acid does not nullify the therapeutic properties of compounds I.

When $R^5$, $R^4$ or $R^2$ is other than a hydrogen atom, $C_1$, $C_2$ or $C_8$, respectively, is an asymmetric carbon atom. Compounds I can have as many as three asymmetric carbon atoms, and either $C_1$, $C_2$ or $C_8$ can be asymmetric irrespective of the symmetry of the others. Compounds I thus include optical and geometric isomers, racemates, racemic mixtures and mixtures of optically active isomers. Resolution of racemates of compounds I into their optical antipodes (enantiomers) is effected according to procedures well-known to the art-skilled.

The preparation of particular acid addition salts and the isolation of chemical individuals (i.e. enantiomers) of compounds I and corresponding acid addition salts do not constitute essential parts of this invention, but the respective products are within the scope of this invention. The methods employed are known methods. When an optically active compound is employed to prepare an acid addition salt, the resulting salt has the same stereochemistry as its precursor. Likewise, optically active compounds I are prepared from corresponding optically active compounds II and/or IV. A compound II or a compound IV having an asymmetric carbon atom is resolved e.g., by preparing the tartrate from an enantiomer of tartaric acid.

Compounds I and their pharmaceutically acceptable acid addition salts are useful as CNS stimulants, antidepressants, anti-inflammatories and antihypertensive-hypotensives. They are administered either orally or parenterally in standard dosage forms, e.g. tablets and capsules, in daily doses of from 20 to 100 milligrams.

Each of the pharmaceutically active compounds of this invention may be, e.g., incorporated, for oral administration, in a tablet as the sole active ingredient. A typical tablet is constituted by from 1 to 3 percent binder, e.g. tragacanth; from 3 to 10 percent disintegrating agent, e.g. cornstarch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compounds is:

| | Parts |
|---|---|
| Title compound of Example 4 | 33 |
| Tragacanth | 2 |
| Lactose | 56.5 |
| Cornstarch | 5 |
| Talcum | 3 |
| Magnesium stearate | 0.5 |
| Alcohol SD-30, purified water: q.s. | |

In the following examples all temperatures are in degrees centigrade. Parts and percentages are by weight unless otherwise specified. The relationship between parts by weight and parts by volume is the same as that between the kilogram and the liter.

EXAMPLE 1

11b-phenyl-1,2,3,4,6,7-hexahydro-11bH-benzo[a]quinolizine methiodide

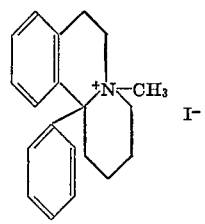

Maintain at room temperature for one and a half days a solution of 10 parts of 11b-phenyl-1,2,3,4,6,7-hexahydro-11bH-benzo[a]quinolizine in 40 parts by volume of diethylether and 20 parts by volume of methyl iodide. Collect the resulting crystals (9.5 parts) by filtration. No further purification of the title compound is required for the next step.

Replacing the methyl iodide with an equivalent of either ethyl chloride or propyl bromide results in the preparation in the same manner of the corresponding quaternary salt IV.

Replacing the 11b-phenyl-1,2,3,4,6,7-hexahydro-11bH-benzo[a]quinolizine with an equivalent of either 1,2,3,4,6,7 - hexahydro - 11bH - benzo[a]quinolizine, 11b-ethyl - 1,2,3,4,6,7 - hexahydro - 11bH - benzo[a]quinolizine results in the preparation, in the same manner, of the corresponding compound IV.

EXAMPLE 2

9,10-dimethoxy-11b-phenyl-1,2,3,4,6,7-hexahydro-11bH-benzo[a]quinolizine methiodide

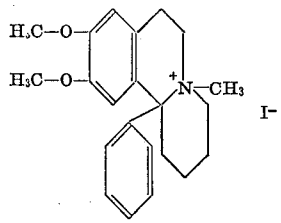

Maintain at room temperature for one day a solution of 8 parts of 9,10-dimethoxy-11b-phenyl-1,2,3,4,6,7-hexahydro-11bH-benzo[a]quinolizine in 10 parts by volume of methanol, 40 parts by volume of diethylether, 8 parts by volume of methylene chloride and 20 parts by volume of methyl iodide. Filter the resulting crystals (9 parts) of title compound and use same for the next step without further purification.

Replacing the 9,10-dimethoxy-11b-phenyl-1,2,3,4,6,7-hexahydro-11bH-benzo[a]quinolizine with an equivalent of either 9-methyl-11b-(3,5-dimethylphenyl-1,2,3,4,6,7-hexahydro-11bH-benzo[a]quinolizine
10-ethyl-11bH-m-methoxyphenyl-1,2,3,4,6,7-hexahydro-11bH-benzo[a]quinolizine or
9,10-methylenedioxy-11b-p-tolyl-1,2,3,4,6,7-hexahydro-11bH-benzo[a]quinolizine results in the preparation, in similar manner of the corresponding compound IV.

EXAMPLE 3

3-methyl-8-phenyl-1,2,3,4,5,6,7,8-octahydro-3-benzazecine hydrochloride

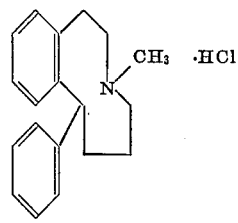

Add 2.4 parts of metallic sodium to a suspension (under stirring) of 9 parts of 11b-phenyl-1,2,3,4,6,7-hexahydro-11bH-benzo[a]quinolizine methiodide (crystals resulting from Example 1) in 500 parts by volume of liquid ammonia, the suspension being in a flask immersed in a Dry Ice/acetone bath. After stirring for one hour, allow the resulting mixture to evaporate overnight (17 hours).

Dissolve the residue with methanol; add water to the obtained solution and extract the resultant with diethylether. Wash the diethylether phase with water, dry same over sodium sulfate and evaporate. Convert the thus-obtained oil to the hydrochloride salt (title compound) by passing excess hydrogen chloride gas through a diethylether solution of the oil.

Crystallize the hydrochloride from methanol/acetone to obtain 6 parts of title compound, melting point (M.P.) 106° to 108°.

Replacing hydrogen chloride with an equivalent of another acid of addition results in the preparation in similar manner of the corresponding acid addition salt. The acid addition salts are reconverted to the free base according to well-established procedures.

EXAMPLE 4

10,11-dimethoxy-3-methyl-8-phenyl-1,2,3,4,5,6,7,8-octahydro-3-benzazecine hydrochloride

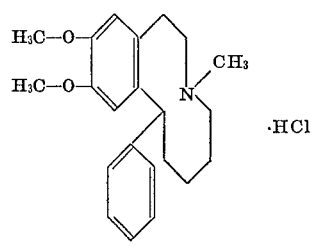

Add 2.4 parts of metallic sodium to a suspension (under stirring) of 8 parts of crystals resulting from Example 2 in 400 parts by volume of liquid ammonia, the suspension being in a flask immersed in a Dry Ice/acetone bath. After stirring for one hour, allow the resulting mixture to evaporate overnight.

Wash the residue successively with methanol, with water and with diethylether. Wash the diethylether phase with water, dry same over sodium sulfate and evaporate to obtain the free base of the title compound as an oil.

The corresponding hydrochloride is obtained by passing excess hydrogen chloride gas through a diethylether solution of the oil.

Crystallize the thus-obtained hydrochloride from methanol/acetone to obtain 5.5 parts of title compound, M.P. 236° to 238°.

Replacing the title compound of Example 2 with an equivalent of any compound IV results in the preparation, in similar manner, of the corresponding compound I or an acid addition salt thereof.

EXAMPLE 5

N-[2-(3,4-dimethoxyphenyl)ethyl]-4-benzoylbutyramide

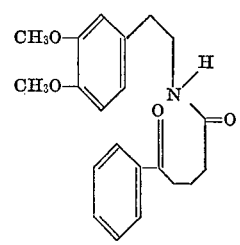

Add dropwise (over a period of one hour) to a stirred solution of 38.4 parts (0.20 mole) of γ-benzoylbutyric acid and 20.2 parts (0.20 mole) of triethylamine in 175 parts by volume of chloroform, within the temperature range of 0° to 5°, a solution of 21.6 parts (0.20 mole) of ethylchloroformate in 25 parts by volume of chloroform. Stir the resultant for an additional three hours.

To the thus-stirred solution, add dropwise (over a period of fifteen minutes) a chloroform solution of 36.2 parts (0.20 mole) of β-(3,4-dimethoxyphenyl)-ethylamine. Stir the thus-obtained reaction mixture overnight; extract same with dilute hydrochloric acid; wash the dilute sodium carbonate solution; dry over sodium sulfate and evaporate in vacuo. Crystallize the residue from benzene-pentane to obtain 40 parts of title compound, M.P. 98°.

Replacing the γ-benzoylbutyric acid with an equivalent of either γ-(3,4-methylenedioxybenzoyl)butyric acid, or 5-oxohexanoic acid or 5-oxo-6-phenylhexanoic acid results in the preparation, in similar manner, of the corresponding compound VIII.

EXAMPLE 6

N-(2-phenylethyl)-4-benzoylbutyramide

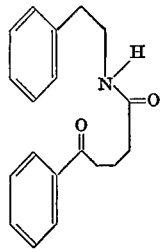

Add dropwise (over a period of one hour) to a stirred solution of 57.6 parts 0.30 mole) of γ-benzoylbutyric acid and 30.1 parts (0.30 mole) of triethylamine in 500 parts by volume of chloroform, within the temperature range of 0° to 5°, a solution of 32.7 parts (0.30 mole) of ethylchloroformate in 80 parts by volume of chloroform. Stir the resultant for an additional three hours. To the thus-stirred solution, add dropwise (over a period of fifteen minutes) a chloroform solution of 36.3 parts (0.30 mole) of 2-phenylethylamine. Stir the thus-obtained reaction mixture overnight; extract same with dilute hydrochloric acid; wash with dilute sodium carbonate solution; dry over sodium sulfate and evaporate in vacuo. Crystallize the residue from benzene-pentane to obtain 42 parts of title compound, M.P. 95° to 96°.

Replacing the 2-phenethylamine with an equivalent of either 2-methyl-2-p-tolylethylamine or 1-ethyl-2-m-tolylethylamine results in the preparation, in similar manner, of the corresponding compound VIII.

EXAMPLE 7

11b-phenyl-1,2,6,7-tetrahydro-11bH-benzo[a]quinolizin-4(3H)-one

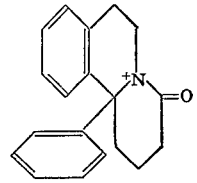

Heat a solution of 5 parts of N-(2-phenylethyl)-4-benzoylbutyramide in 50 parts of polyphosphoric acid at 100° for 16 hours. Admix the thus-obtained dark brown reaction mixture with water and chloroform; wash the organic phase with sodium carbonate solution; dry same over sodium sulfate and evaporate under reduced pressue. Filter a solution of the thus-obtained residue in a benzene-chloroform mixture through a bed of alumina and evaporate the eluant in vacuo. Crystallize the resultant oil from benzene-pentane to obtain 1.3 parts of pure title compound, M.P. 126° to 128°.

Replacing the N-(2-phenethyl)-4-benzoylbutyramide with an equivalent of either N-[2-(3,4-dimethoxyphenyl)ethyl]-4-(3,5-dimethylbenzoyl)butyramide or N-1-methyl-2-p-tolylethyl-4-benzoylbutyramide results in the preparation, in similar manner, of the corresponding compound II.

Another compound of this invention is 8-benzyl-3-methyl-1,2,3,4,5,6,7,8-octahydro-3-benzazecine.

Various changes may be made in the structures of compounds I without departing from the spirit or scope of the invention or sacrificing its material advantages. The examples merely provide illustrative embodiments. All starting materials are either known or are readily prepared by the art-skilled from available compounds.

What is claimed is:
1. The compound 8-benzyl-3-methyl-1,2,3,4,5,6,7,8-octahydro-3-benzazecine.

References Cited

UNITED STATES PATENTS

| 3,055,883 | 9/1962 | Mull | 260—239 |
| 3,314,963 | 4/1967 | Koch | 260—239 |
| 3,393,192 | 7/1968 | Walter et al. | 260—239 |

FOREIGN PATENTS

| 2,710 | 8/1964 | France | 260—239 |

ALTON D. ROLLINS, Primary Examiner

U.S. Cl. X.R.

260—283, 286, 289, 340.5, 559; 424—244, 282

UNITED STATES PATENT AND TRADEMARK OFFICE
CERTIFICATE OF CORRECTION

PATENT NO. : 3,583,976
DATED : June 8, 1971
INVENTOR(S) : WILLIAM J. HOULIHAN and ROBERT E. MANNING It is certified that error appears in the above-identified patent and that said Letters Patent are hereby corrected as shown below:

In the title page, please insert the following:

Assignee: SANDOZ INC.,
59 Route 10,
East Hanover, New Jersey, 07936

Signed and Sealed this thirtieth Day of September 1975

[SEAL]

Attest:

RUTH C. MASON
*Attesting Officer*

C. MARSHALL DANN
*Commissioner of Patents and Trademarks*